(12) United States Patent
Hill (10) Patent No.: US 11,493,422 B2
(45) Date of Patent: Nov. 8, 2022

(54) METHOD AND DEVICE FOR ANALYZING A FLUDIC SAMPLE WITH DISPERSED PARTICLES

(71) Applicant: MEDIZINISCHE UNIVERSITÄT GRAZ, Austria (AT)

(72) Inventor: Christian Hill, Graz (AT)

(73) Assignee: MEDIZINISCHE UNIVERSITÄT GRAZ, Austria (AT)

( * ) Notice: Subject to any disclaimer, the term of this patent is extended or adjusted under 35 U.S.C. 154(b) by 219 days.

(21) Appl. No.: 16/626,979

(22) PCT Filed: Jun. 26, 2018

(86) PCT No.: PCT/EP2018/067100
§ 371 (c)(1),
(2) Date: Dec. 27, 2019

(87) PCT Pub. No.: WO2019/002286
PCT Pub. Date: Jan. 3, 2019

(65) Prior Publication Data
US 2021/0285861 A1 Sep. 16, 2021

(30) Foreign Application Priority Data
Jun. 27, 2017 (EP) .................................... 17178099

(51) Int. Cl.
*G01N 15/02* (2006.01)
*G01N 21/03* (2006.01)
*G02B 21/32* (2006.01)

(52) U.S. Cl.
CPC ......... *G01N 15/0211* (2013.01); *G01N 21/03* (2013.01); *G02B 21/32* (2013.01);
(Continued)

(58) Field of Classification Search
CPC ....... B01L 3/502761; B01L 2300/0858; B01L 2300/0832; B01L 2400/0454;
(Continued)

(56) References Cited

U.S. PATENT DOCUMENTS 4,276,475 A * 6/1981 Nelson .................. G01N 21/05
250/373
4,501,969 A * 2/1985 Lymneos ............... G01N 21/05
250/373
(Continued)

FOREIGN PATENT DOCUMENTS

WO 2013018273 2/2013

OTHER PUBLICATIONS

International Search Report for International Patent Application No. PCT/EP2018/067100 dated Jul. 27, 2018.
International Written Opinion for International Patent Application No. PCT/EP2018/067100 dated Jul. 27, 2018.
Higurashi E. et al. "Optically induced rotation of dissymmetrically shaped fluorinated polyimide micro-objects in optical traps," Journal of Applied Physics, Americn Inst. of Physics, vol. 82, No. 6, Sep. 15, 1997.

(Continued)

*Primary Examiner* — Hoa Q Pham
(74) *Attorney, Agent, or Firm* — Hunton Andrews Kurth LLP (57) ABSTRACT

A method can be provided for analyzing a fluidic sample with dispersed particles. Using such exemplary method, it is possible to irradiate the sample with light, so that the photons of the light transfer momentum to the particles. It is also possible to measure at least one property of the particles that is altered by the momentum transfer. The light can be a propagating beam with an intensity distribution that has gradients pointing to more than one point within each plane normal to the direction of propagation, while varying steadily along the direction of propagation, and/or a 3D vortex trap beam that is configured to confine the particles in a three-dimensional volume by means of high-intensity gradients. An exemplary device can also be provided (e.g., for performing the method), comprising a chamber for (Continued)

holding a sample that is elongate along an axis and configured to pass a beam of light along the axis. The chamber can have a conical inner cross section that substantially expands in the direction of propagation of the beam.

11 Claims, 5 Drawing Sheets

(52) U.S. Cl.
CPC ........... *G01N 2015/0288* (2013.01); *G01N 2021/0382* (2013.01)

(58) Field of Classification Search
CPC .... B21K 1/006; G02B 21/32; G01N 15/0205; G01N 15/0288; G01N 21/03; B01D 21/0009
USPC .......................................... 356/335–343, 73
See application file for complete search history.

(56) References Cited

U.S. PATENT DOCUMENTS

| | | | |
|---|---|---|---|
| 6,307,204 B1* | 10/2001 | Kanomata | G01N 21/05 250/373 |
| 6,696,002 B1 | 2/2004 | Chan et al. | |
| 2003/0132373 A1* | 7/2003 | Curtis | B01F 13/0052 250/251 |
| 2009/0032730 A1 | 2/2009 | Erickson et al. | |
| 2014/0220557 A1* | 8/2014 | Hart | G01N 15/1404 435/6.1 |

OTHER PUBLICATIONS

Miles, Padgett et al. "Tweezers with a twist," Nature Photonics, vol. 5, No. 6, Jun. 1, 2011.

Imasaka T. et al. "Optical chromatography. A new tool for separation of particles," Analusis Magazine, EDP Sciences, Les Ulis, Fr., vol. 26, No. 5, Jan. 1, 1998.

* cited by examiner

METHOD AND DEVICE FOR ANALYZING A FLUDIC SAMPLE WITH DISPERSED PARTICLES

CROSS REFERENCE TO RELATED APPLICATION(S)

This application relates to, and claims the benefit and priority from International Patent Application No. PCT/EP2018/067100 filed on Jun. 26, 2018 that published as International Patent Publication No. WO 2019/002286 on Jan. 3, 2019, which claims the benefit and priority from European Patent Application No. EP 17178099.2 filed on Jun. 27, 2017, the entire disclosures of which are incorporated herein by reference in their entireties.

FIELD OF THE DISCLOSURE

The present disclosure relates to an optical method for analyzing a fluidic sample with dispersed particles, and to a device that is particularly suited for performing this method.

BACKGROUND INFORMATION

Nanoparticles, especially in the biotechnological and pharmaceutical fields, possess significant potential for future applications. However, undefined and heterogenic particle populations demand for analytic tools and advanced manipulation and separation equipment for a focused and controlled application. Since the discovery was made that photons can be used to manipulate particles in the nano- to microscopic size regime through momentum transfer, research efforts have focused on different application and innovations using this approach. One special methodology in this field, Optical Force Chromatography (OFC), is disclosed in, e.g., T.Imasaka, "Optical chromatography. A new tool for separation of particles.", Analysis 26.5: 53-53 (1998). This method achieves characterization and separation of heterogeneous mixtures in a liquid medium by the application of optical forces that counteract well-defined fluidic drag forces within a capillary. Since then, the technology has matured into many laboratory instruments, an example of which is the Laser Force Cytology device that is marketed by LumaCyte Inc. and described, e.g., in U.S. Pat. No. 8,753,891.

To date, the downside of OFC is that it has concentration and throughput limitations. All particles have to line up along one single line corresponding to the laser beam. This creates dynamic range limitations and severe problems with particle-to-particle interaction within the separation area. In the end, the application of OFC is limited to highly diluted samples and certain single particle applications.

EXEMPLARY OBJECTS OF EXEMPLARY EMBODIMENTS

It is therefore at least some of the objects of the present disclosure to relieve the problem of particle- to-particle interactions in OFC, enabling the use of OFC also in lesser diluted samples.

At least some of such objects can be achieved by exemplary methods and devices described herein.

SUMMARY OF EXEMPLARY EMBODIMENTS

To that end, exemplary methods for analyzing a fluidic sample with dispersed particles can be provided according to exemplary embodiments of the present disclosure. For example, the sample can be irradiated with light, so that the photons of the light transfer momentum to the particles. At least one property of the particles that can be altered by the momentum transfer is measured.

According to exemplary embodiments of the present disclosure, the light can be
- a propagating beam with an intensity distribution that has gradients pointing to more than one point within each plane normal to the direction of propagation, while varying steadily along the direction of propagation, and/or
- a 3D vortex trap beam that is configured to confine the particles in a three-dimensional volume by means of high-intensity gradients.

For example, the root cause for the described limitations of OFC lies in the type of beam that was being used since the original conception of the method described in the Imasaka publication. The optical arrangement uses a standard TEM00 laser beam profile for force induction. In a cross section perpendicular to direction of propagation, a TEM00 beam has only one single maximum in the center of the beam. This single maximum defines one single line along the axis of propagation where all the particles will line up due to gradient forces pointing to the single maximum if they are to experience a momentum transfer. The working space is basically limited to one dimension.

In contrast, the beam profiles according to the instant invention provide a high intensity in three-dimensional volumetric regions that can serve as the working space where the particles can experience a momentum transfer. The working space may, e.g., be conically shaped. The particles have more degrees of freedom within this three-dimensional working space: they may move almost freely within the working space and even overtake other particles. This in turn increases the dynamical range, sensitivity and throughput of measurements of properties that are altered by the momentum transfer. For example, through this unhindered movement, laser force induced particle velocity trajectories towards their equilibrium position can be measured and directly attributed to corresponding particle sizes.

A beam with gradients pointing to more than one point within each plane normal to the direction of propagation may, e.g., be a laser beam with a transverse electromagnetic mode other than TEM00. Even if such a mode has an intensity profile with several disparate maxima that are distributed across its cross section, i.e., the particles cannot move from one maximum to the next one, each of these maxima will already give the particles a volumetric working space.

Such beam may exert a net force on the particles in a preferred direction that has a component along the direction of propagation. In the absence of any counteracting forces, e.g., a fluidic drag force, the particles may steadily move in this preferred direction until they eventually hit a wall of the container that is holding the fluidic sample. In contrast, a 3D vortex trap beam confines the particles by means of "immaterial walls" consisting of high-intensity gradients. The particles may move freely inside the three-dimensional volume defined by the vortex trap beam, but they may not leave this volume. This volume may be configured to be far away from any wall of the container, so the particles may be studied in the absence of any artifacts caused by container walls.

If a transverse electromagnetic mode is used, in an exemplary embodiment of the present disclosure, this mode has at least one maximum in a plane normal to the direction of propagation that is annular around the axis of propagation. When this annular maximum is "extruded" along the axis of propagation (including a possible expansion of the beam), it forms a three-dimensional working space where the particles have an additional degree of freedom in the azimuthal direction along the circumference of the annulus. For example, the irradiation may transfer an angular momentum to the particles as well, sending the particles, e.g., on a helical path inside the three-dimensional working space.

One example of a beam that transfers an angular momentum to the particles is a cylindrical TEM01* mode. Therefore, in an exemplary embodiment of the present disclosure, such a mode is used to effect both the construction of the three-dimensional working space and the transfer of an angular momentum to the particles at the same time.

One of the exemplary advantages of the exemplary embodiments of the present disclosure that the effects of particle-to-particle interactions are eliminated from a measurement setup where the effect of a momentum transfer to particles is studied. This eliminates a major source of error specifically from the analysis of the motion that the particle performs in response to the momentum transfer. Therefore, in a further specially advantageous embodiment of the present disclosure, the method further comprises measuring at least one of: a steady speed that a particle reaches while being irradiated, a decay or building behavior of the speed of a particle after discontinuing or initiating the irradiation, or an orbital momentum or a rotation induced by the irradiation.

A similar source of error is eliminated from measurements where the force resulting from the momentum transfer is augmented, or counteracted, by a fluidic drag force. Therefore, in a further exemplary embodiment of the present disclosure, the method further comprises flowing the fluidic sample in a direction substantially parallel, or substantially opposite, to the direction of propagation.

For a quantitative analysis of the behavior of the particles, it is better if the fluidic drag force is known for every particle in the chamber that is holding the fluidic sample. To this end, preferably, the spatial distribution of the flow rate is configured to satisfy a predetermined continuity equation. In an exemplary embodiment, the flow rate may vary across the cross section of the flow in a parabolic manner, while being highest in the center of said cross section.

Balancing the force exerted by the momentum transfer against a fluidic drag force may, for example, be used to separate particles that move at a different speed in the direction of propagation than the rest of the particles from said rest of the particles. For example, there may be only a fraction of particles that performs a net motion in the direction of propagation, while other particles stay still or move in the opposite direction. This particle separation works similarly to the previous OFC, with an important difference: the accuracy with which particles, e.g., of different sizes can be distinguished from one another is greatly improved because the differences in the motion of particles that are caused by actual differences between the particles are no longer convolved with the effects of particle-to-particle interactions.

To track particles, preferably, light that has been scattered by the particles in a direction substantially perpendicular to the direction of propagation is captured. The scattered light can directly be attributed to individual particles, and a large number of particles may be monitored simultaneously by acquiring an image of an area that holds the particles.

Sizing and characterization methods may be coarsely classified into ensemble methods, counting methods and separation methods. By providing both separation and tracking, the instant invention provides a combined separating-counting method. A prime ensemble method in use today is dynamic light scattering, DLS, that has the advantages that
  it is an easy to use method,
  a minimum amount of sample information is needed,
  it can be used over a highly flexible sample concentration range,
  very low sample sizes (down to 0.3 nm) can be measured, and
  it is a known technique where standardized protocols are available at the price that
  samples with a high polydispersity index, PDI, tend to cover small particles due to enormous scattering intensity differences;
  high-PDI samples cause larger method-errors through averaging;
  a mix of materials will influence the measurement and lead to errors;
  low concentrations of particle populations are hardly detectable;
  a concentration measurement is only possible in an indirect manner, e.g., via sample transmission; and
  it is not a "user-observable" measuring principle.

Compared with DLS, the combination of separation and tracking according to the instant invention has several advantages:
  the influence of a high PDI is negligible, so a scan through all size pins is possible;
  the measurements are direct and real time observable measurements, which increases customer confidence;
  detection sensitivity can be adjusted in each size pin down to single particle detection;
  an extended range of particle sizes is measurable, at least between 20 nm and 100 ilm;
  only a small sample volume, e.g., between 5 μl and 100 ill, is needed;
  the total particle concentration and the particle concentration for each size-pin can directly be derived;
  particles can be separated and sized in the same measuring step;
  further operations, such as trapping, sorting, or fluorescence measurements, may be performed on the same platform;
  the intrinsic properties of particles become detectable and sortable (e.g., different protein to lipid ratios).

The small price to pay for these advantages is that the physical pathway of the measurement is more complex: The size distribution is not obtained directly via Brownian motion, but via differences in forces induced by optical momentum transfer. Also, a little more information (i.e., the refractive index) about the sample is needed.

A prime counting method in use recently is the nanoparticle tracking analysis, NTA; method that correlates the rate of Brownian motion with the particle size. This method has the advantages that
  a direct visualization of particles allows for a high customer confidence and for a visual preliminary sample evaluation;
  no scattering intensity may influence the size measurement because only Brownian motion is detected;
  the "one by one" approach resolves polydispersity better;
  a pure size measurement without a contribution by a refractive index is possible;

aggregation and flocculation of particles are observable in real time; and a concentration measurement is possible at the price that the method is limited to a broad size distribution. Due to the "one by one" approach, not all size pins can be measured, so the PDI is not deducible in full;

the two-dimensional detection of the three-dimensional Brownian motion introduces intrinsic measurement errors;

the short tracking intervals further degrade the accuracy;

the Gaussian beam profile influences the measurement of differently sized particles, which leads to further errors, and high-PDI samples can cover small particles due to enormous scattering intensity differences.

Compared with NTA, the combination of separation and tracking according to the exemplary embodiments of the present disclosure has several advantages:

Particles are transported through the measuring window automatically, allowing for a high particle measuring statistics;

detection of big and small particles, independently from their concentration rations, is possible, so all size-pins may be evaluated and a full PDI is deducible;

the optically induced forces may have a preferred direction, so that, compared with the statistical Brownian motion in three dimensions, a clear one-dimensional measuring parameter is available. Distance, speed, and (de)acceleration may therefore be derived by tracking algorithms;

the detection sensitivity can be adjusted in each size pin, down to single particle detection;

intrinsic properties of particles are detectable and sortable (e.g., protein to lipid ratios), and further operations, such as trapping, sorting, or fluorescence measurements, may be performed on the same platform.

Akin to the comparison with DLS, the main price to pay is that knowledge about the refractive index of the sample is needed, and the physical pathway of the measurement is more complex.

Prime separation methods in use today are asymmetric flow field flow fractionation, AF4, and size-exclusion chromatography, SEC, with gel permeation chromatography, GPC, as its exemplary embodiment. These separation methods have the advantage that GPC/SEC can separate very small particles (a few DA molecules);

GPC/SEC is upscaleable to a much higher throughput;

AF4 offers a wide separation range between 1 nm and 50 ilm;

AF4 has no stationary phase, so no matrix interaction is possible;

the technologies are well-established, so approved standards and protocols are available at the price that highly trained operators are necessary;

shear degradation, column clogging and unwanted interactions with the stationary phase introduce artifacts into GPC/SEC measurements;

matrix interaction causes recovery problems;

separation and detection need to be performed by separate devices, which makes the analysis more complex;

GPC/SEC can hardly separate bigger molecules and polymers (the range ends at about 20 nm);

in AF4, membrane interaction and initial separation starting conditions are critical;

AF4 membranes are consumable parts, are difficult to install, and have a low reproducibility due to manufacturing variations in the pore sizes; and GPC/SEC is very cost-intensive.

Compared with GPC/SEC and AF4, the combination of separation and tracking according to the exemplary embodiments of the present disclosure has several advantages:

it is applicable to homogeneous and heterogeneous samples. Particles can be present in solution, or as a colloidal system, such as an emulsion or a dispersion;

in contrast to GPC/SEC, no stationary phase is necessary;

in contrast to AF4, no membrane is necessary;

the method is very sensitive and usable for very low concentration samples, down to single particle filtration; and operation can directly be observed and performance evaluated.

The small price to pay is that the separation volume is dependent on the refractive index of the solvent, and the separation is dependent on optical contrast (a higher optical contrast leads to a better separation performance).

In a further exemplary embodiment of the present disclosure, at least one particle that is larger than the wavelength of the light is illuminated unevenly, and a compression of the particle caused by the uneven illumination is detected. This compression may be measured more accurately as well: because there is more space available in the three-dimensional working volume, the pattern of illumination on the particle in question is not unintentionally changed by other particles shadowing off the light, and the particle in question is also not directly interacted upon by the other particles.

The exemplary advantages of the method according to the exemplary embodiments of the present disclosure are as follows:

Because the particles can move unhindered within the beam, in addition to a mere equilibrium position between the optically induced force and a fluidic drag force, non-equilibrium velocity tracking of particles becomes possible.

Because the volume of the three-dimensional working space is many times larger than the "volume" of the mere one-dimensional channel formed by the TEM00 mode, a correspondingly large separation area can be used to filter, separate and concentrate particles. This in turn permits particle concentrations on the order of $10^8$ particles/ml to be used, whereas the prior art permitted only the study of single particles in low concentration samples.

By tailoring the microfluidic flow of the sample to the conical particle confinement, the measurements have a high sensitivity both in high intensity and in low intensity regions, and the dynamic range may be further improved.

The far larger three-dimensional working space permits a far higher throughput because the particles do not need to line up behind one another. Throughputs on the order of $10^6$ particles/minute are within reach.

The tendency of the particles to aggregate is greatly reduced in the three-dimensional working space.

According to additional exemplary embodiments, a device for performing the method according to the present disclosure can be provided. This exemplary device comprises a chamber for holding a sample. The chamber is elongate along an axis and configured to pass a beam of light along said axis. According to the exemplary embodiments of the present disclosure, the chamber has a conical inner cross section that substantially expands in the direction of propagation of the beam.

For example, this exemplary design advantageously adapts microfluidic drag forces in the chamber to the forces induced by momentum transfer from photons of the light to the particles. Different equilibrium positions along the propagation axis of the beam correspond to different distances along the axis perpendicular to this propagation axis. Consequently, bigger particles experience smaller drag forces in low optical intensity regions due to microfluidically determined flow profiles. This creates a well-defined, efficient and highly sensitive working space to further enhance the sensitivity and dynamic range.

The chamber may, for example, be designed using computational fluid dynamics and manufactured using corresponding microfabrication techniques.

In a specially advantageous embodiment of the present disclosure, the device further comprises a laser configured to pass a beam into the chamber. In one example, the beam expands in the direction of propagation as the inner cross section of the chamber expands. The shape of the chamber is then optimally matched to the shape of the three-dimensional working space created therein.

In a further exemplary embodiments of the present disclosure, the optical path between the laser and the chamber comprises a half-wave plate in series with a diffractive optical element. This setup may be used to shape the TEM01* mode that is most useful in the context of the method presented above.

In yet further exemplary embodiments embodiment of the present disclosure, the device further comprises at least a first position sensitive detector for light that has been scattered by particles in the sample substantially perpendicular to the direction of propagation and a second detector for light that has wholly traversed the sample along the direction of propagation. The first detector may then be used to track individual particles as they are moving through the chamber under the combination of momentum transfer from photons and microfluidic drag forces. The second detector may at the same time be used to control the status of the chamber and evaluate the beam profile.

The three-dimensional working space together with the microfluidic design of the sample chamber boosts OFC from a "niche existence for specialized applications" into a multi parameter particle characterization, separation and manipulation platform. This platform can be operated in three main operation modes:

Particle Characterization;
Particle Separation; and
Trapping and Single Particle analysis.

All these exemplary operation modes operate label-free, contact-free (i.e., without a stationary phase) and non-invasively as a continuous flow or batch setup in a liquid environment with ultra-low sample volume acceptance down to 5 μl for costly pharmaceuticals or rare biological extractions. In the following, the three operation modes are summarized and referenced to competing technologies currently commercially available:

Particle Characterization competes, for example, with DLS, NTA and MALS. Particle sizes and size distributions may be measured in a range between 20 nm and 100 um via "Particle Velocity Tracking" and enhanced "Equilibrium Distance Detection". By means of particle scattering, particles of any selected "size pin" may be visualized down to single particle sensitivity.

Particle Separation competes, for example, with AF4, GPC/SEC, FPLC, FACS and AUC. Particles may be separated referring to size, or referring to intrinsic properties, such as differences in particle compositions. In this exemplary manner, for example, cell populations may be sorted in a manner similar to FACS or ultra-centrifuge separation. The method therefore may provide an optical filter that works akin to a mechanical filter with a tunable membrane size.

Trapping and Single Particle analysis competes, for example, with AFM, micropipette aspiration, optical stretchers, optical traps and micro fluidic lab-on-chip platforms. Due to the unhindered motion of the particles in the three-dimensional working space, viscoelastic particle properties and cell stiffness are deducible from the observed behavior of the particles. The deformability of particles, such as red blood cells, may be studied. Trapped, or otherwise isolated, single cells or particles may also be analyzed using other optical methods, such as transmitted light and fluorescent microscopy, or Raman spectroscopy.

The method and device may, for example, be used in the pharmaceutical industry for:
  drug design (e.g., vaccine characterization, antibody and protein-based drug development);
  characterization and segregation of pharmaceutically active nanoparticles, such as protamine oligonucleotides coated with peanut allergen for human immunization vaccinations;
  vaccine development (e.g., size measurements and time related quantification of the formation of outer membrane vesicles that provide the potential for vaccinations);
  formulation development (e.g., emulsification control for therapeutig administration, or physical parameters of micro-emulsions);
  online quality control (e.g., micro particle formation control, packing density evaluation, bypass evaluation for industrial micro fluidic stacks, or Doxil—liposomal preparation for chemotherapy)

The exemplary method and device may, for example, be used in medical and clinical diagnostics to study:
  deformability of erythrocytes (e.g., glycosylation of hemoglobin for diabetes mellitus diagnostics), or
  cell viscoelastic properties measurement (e.g. cancer cells display a cell softening versus normal cells).

The method and device may, for example, be used in the food industries for the development of nano-sized food addirives (e.g., nanoencapsulation of flavors and nutrients via sterical stability measurements).

The method and device may, for example, be used in the cosmetics and perfumes industry for:
  characterizing liposomal cream formulations (e.g., research and development of niosomes);
  characterizing particles used in sun screen, make-up and creams, or
  characterizing nanoparticles used for fragrance retention.

The method and device may, for example, be used in biotechnology for
  studying extracellular vesical in bacteria (e.g., detection, quantification and sizing); or
  microbiom research and characterization.

The aspects described above and further aspects, features and advantages of the present disclosure may also be found in the exemplary embodiments which are described in the following with reference to the appended drawings and claims.

BRIEF DESCRIPTION OF THE DRAWINGS

Further exemplary embodiments of the present disclosure are detailed in the description of the Figures, where this description shall not limit the scope of the present disclosure and the drawings are not necessarily provided to scale. The Figures show.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure as defined by the appended claims.

DETAILED DESCRIPTION OF EXEMPLARY EMBODIMENTS

Figure 1:
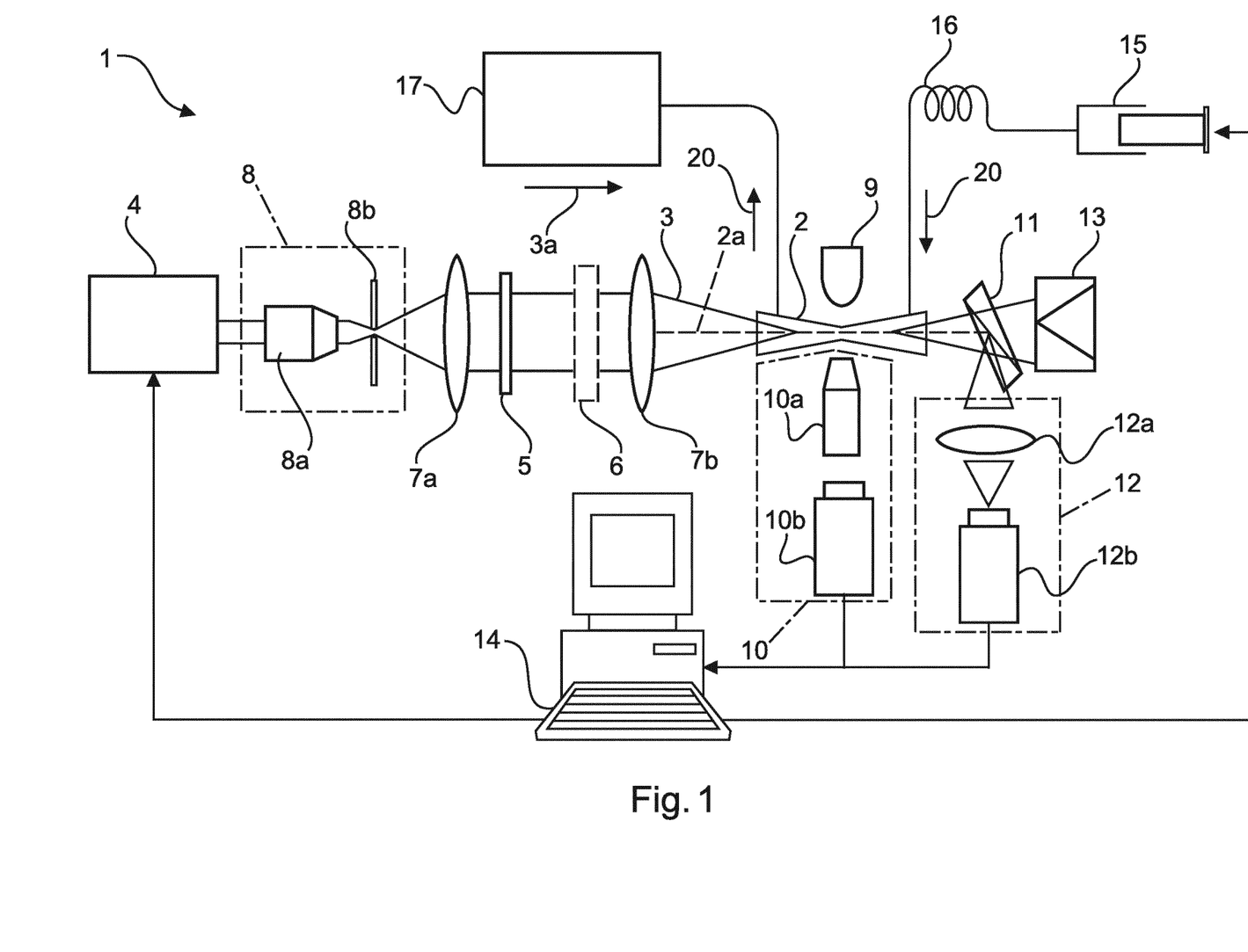
FIG. 1 is as schematic illustration of an exemplary embodiment of the device according to the present disclosure.

FIG. 1 illustrates an exemplary embodiment of the device 1 according to the present disclosure. The device 1 comprises a chamber 2 to accommodate a fluidic sample 20. The sample 20 is pumped by a microfluidic syringe pump 15 from a 1 ml syringe at a rate of 0.1-10 ill/min through a 20 ill sample loop 16 into the 10 ill fused silica capillary chamber 2 of about 600 ilm diameter and traverses the chamber 2 from right to left. After having traversed the chamber 2, the sample 20 is collected by a sample collector 17. The chamber 2 is elongate with an axis 2a.

Light emitted from a 532 nm DPSS laser 4 passes through a spatial filter 8 that comprises an objective 8a and a diaphragm 8b. By means of a first lens 7a, the light is converted into a parallel beam that passes through a fused silica half-wave plate 5 and a diffractive optical element 6 before being concentrated again by means of a second lens 7b. In this manner, a beam 3 is formed that substantially consists of a cylindrical TEM01* mode with a defined ring size; in other words, the laser beam profile in the focal region of the objective 8a is vortex-converted into an annular mode.

The chamber 2 is transparent, and can be observed by means of a position sensitive detector 10 that comprises an objective 10a and a camera 10b. This position sensitive detector 10 can capture light that has been scattered by the sample 20 in the chamber 2 in a direction perpendicular to the direction of propagation 3a, as well as auxiliary light that has been transmitted through the chamber 2 in the same direction from an auxiliary light source 9.

After having passed the chamber 2, a portion of the beam 3 is split off by means of a beam splitter 11 and fed into a second detector 12 comprising a lens 12a and a camera 12b. The beam splitter 11 serves to reduce the intensity because the laser 4 is very intense (e.g., 3 W CW power). Most of the intensity is therefore discarded in a beam dump 13.

The image information from both cameras 10b and 12b is recorded by the computer 14 that also controls the laser 4 and the microfluidic syringe pump 15.

FIG. 2 illustrates the intensity distribution 31 of the laser beam 3 in a plane 36 perpendicular to the direction of propagation 3a for two exemplary modes that are usable in the context of the exemplary embodiments of the present disclosure.

Figure 2A:
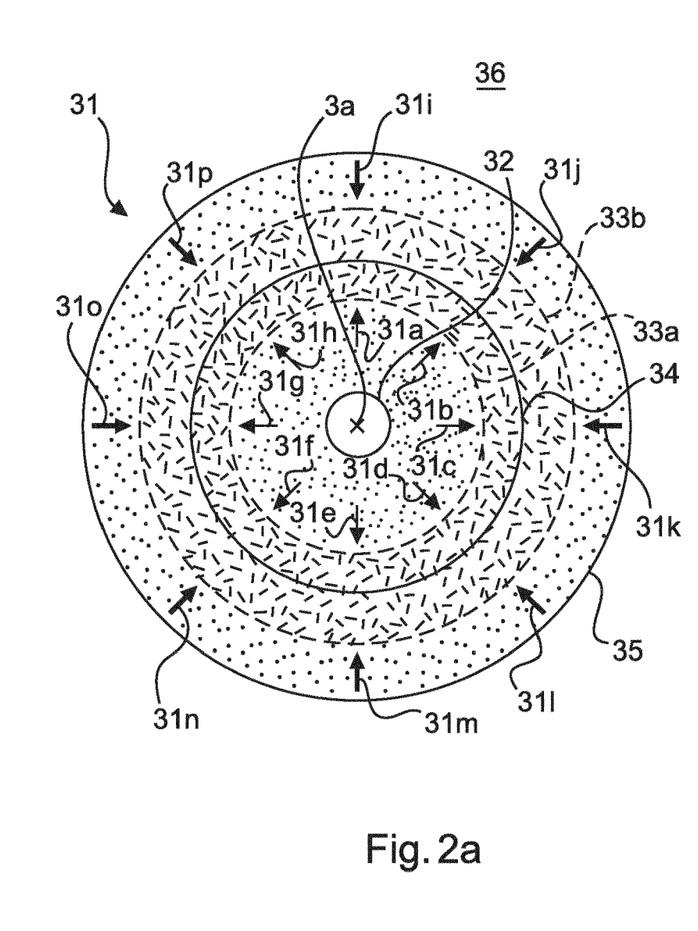
FIG. 2 is an illustration of exemplary usable transverse electromagnetic modes.

FIG. 2a illustrates a cylindrical TEM01* mode. The intensity in various areas of the cross section is denoted by the density of the dots with which each area is filled. Inside the circle 32 and outside of the circle 35, the intensity is vanishing, so these areas are not filled with dots. Moving radially outward from the circle 32, one encounters a region of comparatively low intensities that gives way to a region of comparatively high intensities that is bounded by circles 33a and 33b. Within the latter region, the annular intensity maximum is denoted by circle 34. Between circles 33b and 35, there is a further region of comparatively low intensities. Various exemplary gradients 31a-31p that point from lower intensities to higher intensities are shown in FIG. 2a.

When the high intensity region between circles 33a and 33b is "extruded" along the direction of propagation 3a out of the plane 36 that corresponds to the plane of the drawing, it will form a contiguous three-dimensional working space in which particles 24a-24p comprised in a fluidic sample 20 may move driven by the momentum transfer from the beam 3. Specifically, within this space, the particles 24a-24p may overtake each other and also move in an azimuthal direction around a circumference of the annulus (e.g., along circle 34 that represents the maximum). In combination with the forward movement along the direction of propagation 3a, the motion of the particles 24a-24p may therefore, e.g., be a helical motion.

Figure 2B:
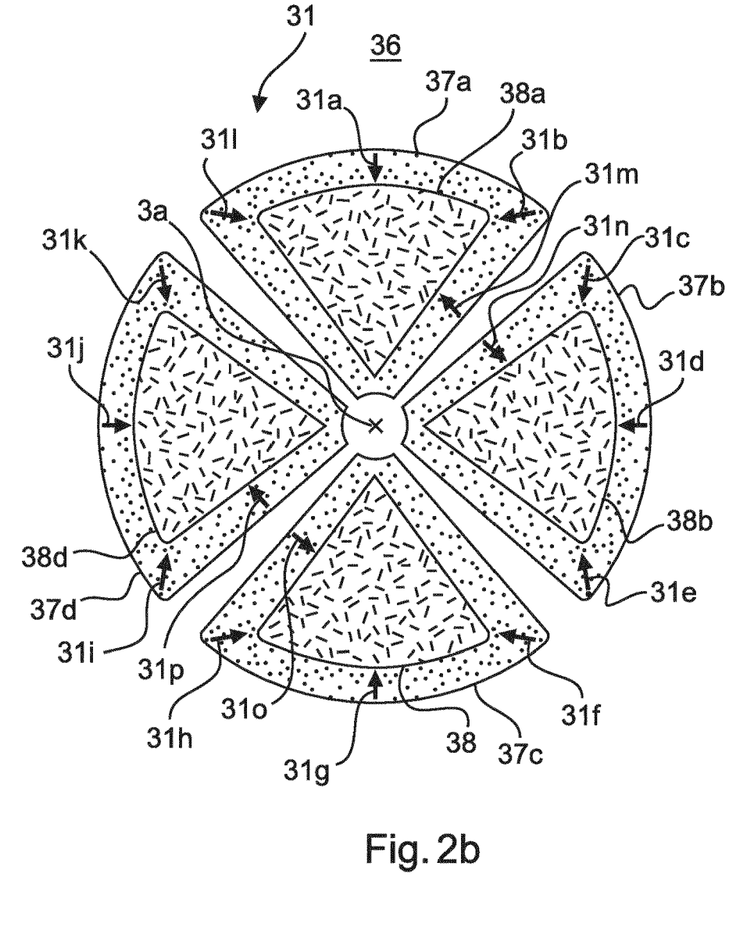

FIG. 2b illustrates another mode that is usable in the context of the present disclosure. This is the cylindrical TEM02 mode. The intensity profile 31 is basically split into a first lobe with lower-intensity region 37a and a higher-intensity region 38a embedded therein, a second lobe with lower-intensity region 37b and a higher-intensity region 38b embedded therein, a third lobe with lower-intensity region 37c and a higher-intensity region 38c embedded therein, and a fourth lobe with lower-intensity region 37d and a higher-intensity region 38d embedded therein.

Each higher-intensity region 38a-38d, when extruded in the direction of propagation 3a out of the plane 36, forms a working space of its own for any particles 24a-24p comprised in the sample 20. However, particles 24a-24p will not be able to move from one such region 38a-38d to another one.

Figure 3:
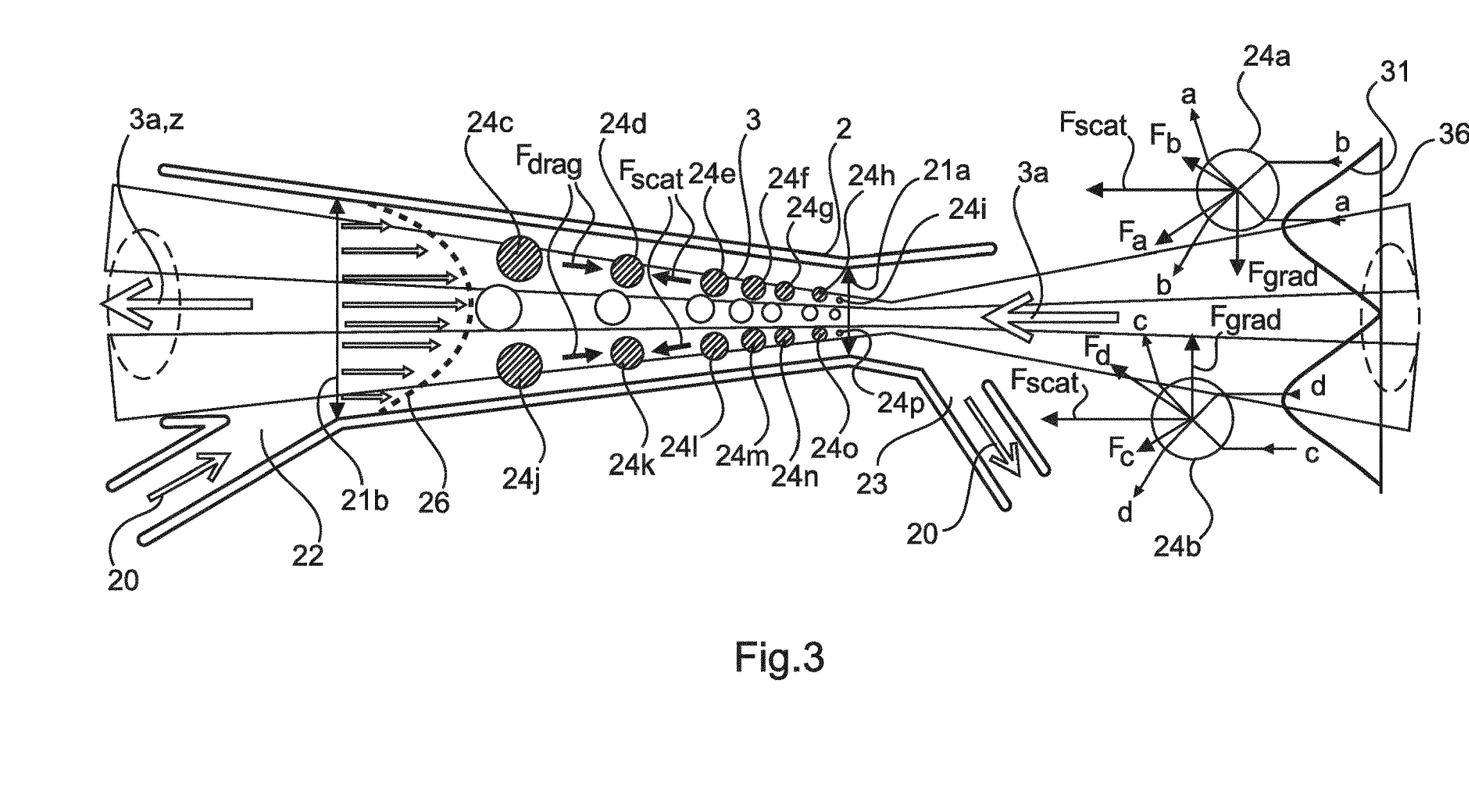
FIG. 3 an illustration of a ray-optics model of a 3D conical shaped working space.

FIG. 3 illustrates how scattering forces $F_{scat}$ are balanced against fluidic drag forces Fdrag in the chamber 2, where a ray-optical model is used to understand the scattering forces Fscat. Along the direction of propagation 3a of the beam 3 with its intensity profile 31, the cross section 21a, 21b of the chamber 2 expands substantially as the beam 3 expands. This causes the flow rate 26 of the sample 20, which is flowing from an inlet 22 on the left-hand side to an outlet 23 on the right-hand side in a direction opposite to the direction of propagation 3a of the beam 3, to vary in a parabolic manner with a maximum in the center of the cross section 21a, 21b, whereas the intensity of the beam 3 with its intensity profile 31 has a minimum in the center of the cross section 21a, 21b.

The particles 24c-24p have varying sizes, and they experience a scattering force Fscat and a drag force Fdrag that both increase with the particle size. Consequently, the locations in the chamber 2 at which both forces are in equilibrium are different for the differently sized particles 24c-24p. This may be used to separate the particles according to their size.

On the right-hand side of FIG. 3, it is schematically illustrated how the intensity profile 31 of the beam 3 exerts forces onto exemplary particles 24a and 24b by momentum transfer from four exemplary photons a-d. It is shown in which directions the photons a-d are scattered in the process, and which force each photon a-d exerts on the particles 24a-24b upon impact. Strictly speaking, a higher intensity of the laser beam 3 means that more photons per second impinge on the particle 24a, 24b. In the partial ray-optical model of FIG. 3, this is modelled by photons coming from a higher-intensity region of the intensity distribution 31 exerting a higher force.

The total force exerted on the particles 24a, 24b by all impinging photons can be understood to have a component Fscat in a direction parallel to the direction of propagation 3a, as well as a component $F_{g}$rad in a direction towards the intensity maximum, perpendicular to the direction of propagation 3a.

In the exemplary configuration shown in FIGS. 1 and 3, the force transfer to a particle may be on the order of 1 pN to 1 nN. The liquid of the sample 20 may, for example, be water, EtOH, or isopropanol. Additional forces may be introduced into the liquid environment using concentration gradients.

Figure 4:
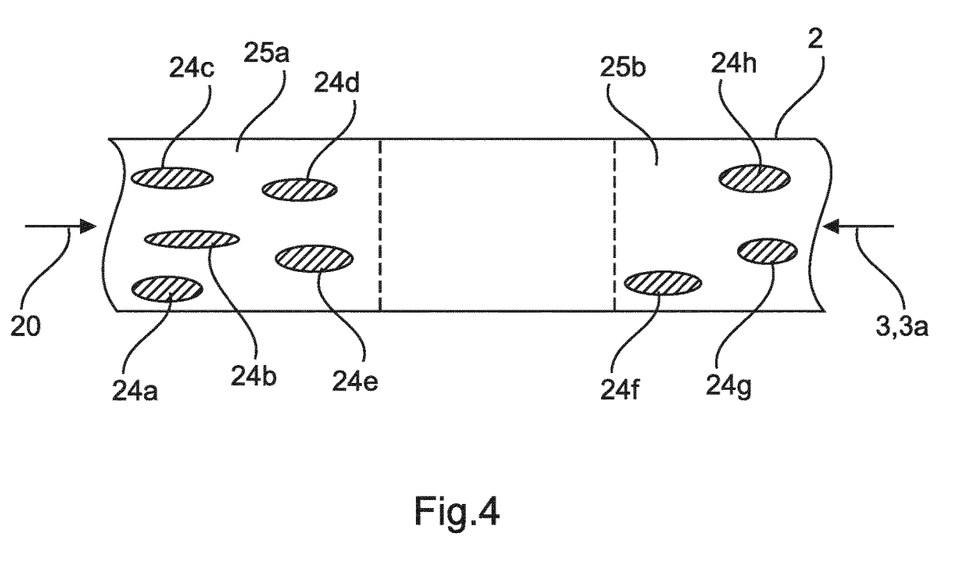
FIG. 4 is an exemplary drawing of the microscopic picture that can be expected during particle separation.

FIG. 4 illustrates microscopic images that can be expected on the camera 10b of the device 1 shown in FIG. 1 when the sample 20 comprises particles 24a-24g of different size. In the example shown in FIG. 4, the sample 20 is a very highly diluted sample of polystyrene beads in water. The beads comprise a first portion of beads each having a size of 940 nm, of which five examples are labelled 24a-24e in FIG. 4, and a second portion of beads each having a size of 200 nm, of which three examples are labelled 24f-24h in FIG. 4.

Because the larger beads 24a-24e experience a higher force from the irradiation with the laser beam 3, they accumulate in a first region 25a on the left-hand side of the chamber 2. The smaller beads 24f-24h, on the other hand, accumulate in a second region 25b on the right-hand side of the chamber 2. The widths of the regions 25a and 25b are a measure for the dispersities within the groups 24a-24e and 24f-24h of beads.

The sizes of the particles shown in FIG. 4 are not drawn to relative scale, i.e., the 200 nm sized beads 24f-24h are not drawn to less than a quarter of the size of the 940 nm sized beads 24a-24e. The reason for this is that in an image of the light scattered by the particles 24a-24h, both types of particles will be smeared to roughly the same size.

Figure 5:
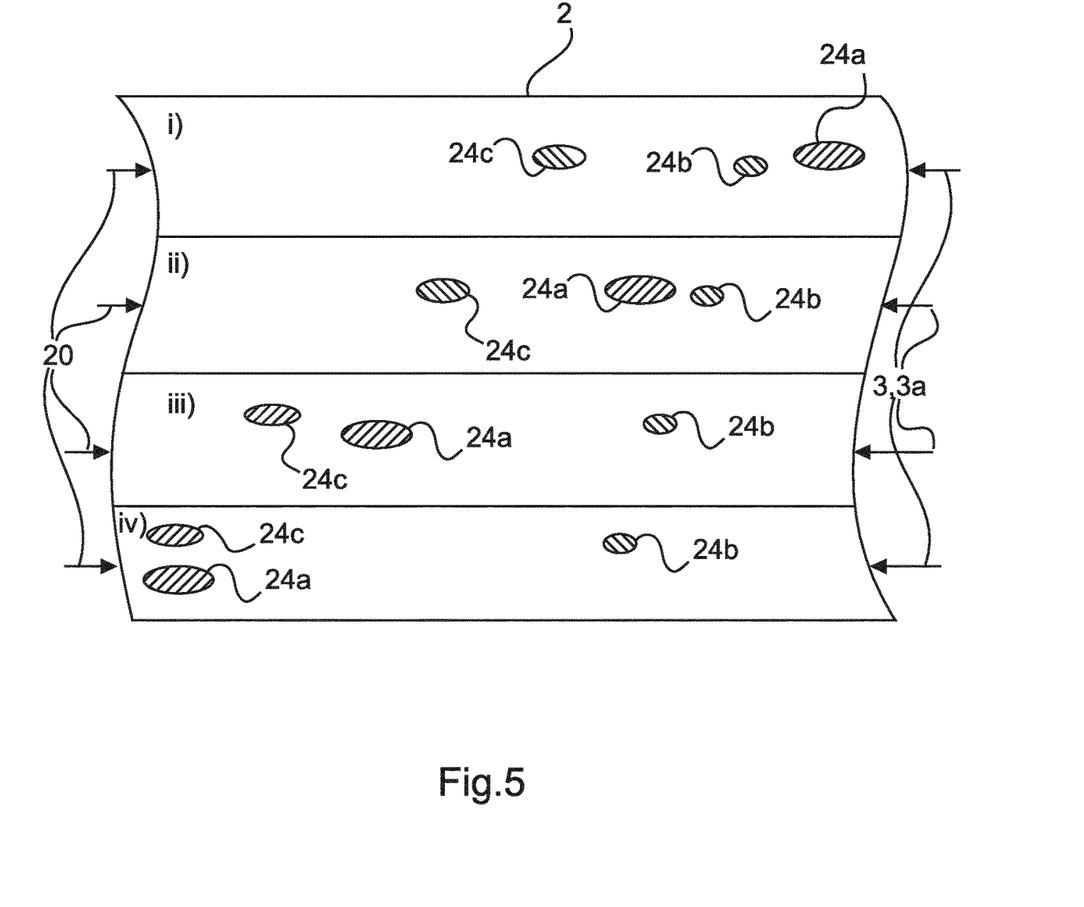
FIG. 5 is a set of exemplary drawings of microscopic pictures from which the velocities of particles may be tracked.

FIG. 5 illustrates microscopic images that can be expected on the camera 10b of the device 1 shown in FIG. 1 when three exemplary particles 24a-24c of different sizes are tracked over a time span of several image frames i) to iv) while they are subjected to a scattering force from the laser beam 3 directed from right to left and a drag force from the fluidic flow directed from left to right. In contrast to FIG. 4, the size difference between the particles 24a, 24b and 24c has been drawn on an exaggerated scale in FIG. 5 to better visualize the distinction between these particles.

Particle 24a is the largest particle and moves fastest from right to left in the sequence of frames i) to iv). Particle 24b is the smallest particle and moves slowest. Particle 24c has a size in between the sizes of particle 24a and particle 24b. It arrives at the left-hand side of the chamber 2 at the same time as particle 24a, but it started out farther left in frame i) than particle 24a. Thus, particle 24c moves slower than particle 24a, but faster than particle 24b.

The velocity of the particles 24a-24c can be mathematically correlated to their size, so by tracking individual particles 24a-24c, their size may be determined.

It has to be noted that the exemplary embodiments of the present disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the exemplary embodiments of the present disclosure has been illustrated and described in detail in the drawings and foregoing description, such illustration and description are to be considered illustrative or exemplary and not restrictive. The present disclosure is not limited to the disclosed exemplary embodiments. Other variations to the disclosed exemplary embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

EXEMPLARY LIST OF REFERENCE SIGNS 1 device
2 chamber
2a axis of chamber 2
3 beam
3a direction of propagation of beam 3
4 laser
5 half-wave plate
6 diffractive element
7a, 7b lenses
8 spatial filter
8a objective in spatial filter 8
8b diaphragm in spatial filter 8
9 auxiliary light source
10 position sensitive detector
10a objective in detector 10
10b camera in detector 10
11 beam splitter
12 detector for transmitted light
12a lens in detector 12
12b camera in detector 12
13 beam dump
14 computer
15 microfluidic syringe pump
16 sample loop
17 sample collector
20 fluidic sample 21a, 21b cross sections of chamber 2
22 inlet of chamber 2
23 outlet of chamber 2
24a-24p particles
25a, 25b regions where differently sized particles 24a-24h collect
26 spatial distribution of flow rate in chamber 2
31 intensity distribution of beam 3
31a-31p gradients of intensity distribution 31
32 inner limit of lower-intensity region
33a inner limit of higher-intensity region
33b outer limit of higher-intensity region
34 annular intensity maximum
35 outer limit of lower-intensity region
36 plane normal to direction of propagation 3a
37a-37d lower-intensity regions
38a-38d higher-intensity regions
a-d photons
Fa-Fa forces exerted by photons a-d
Fdrag fluidic drag force
Fgrad gradient forces towards lower intensities Facat optically induced scattering force
x, z coordinate axes

The invention claimed is:

1. A method for analyzing a fluidic sample with dispersed particles, comprising:
   irradiating the fluidic sample with light, so that the photons of a light transfer momentum to the dispersed particles; and
   measuring at least one property of the dispersed particles that is altered by the momentum transfer,
   wherein the light is a beam that is at least one of (i) a propagating beam having an intensity distribution that has gradients pointing to more than one point within each plane normal to a direction of propagation, while varying steadily along the direction of propagation, or (ii) a three-dimensional vortex trap beam that is configured to confine the dispersed particles in a three-dimensional volume using high-intensity gradients, and wherein:
   the fluidic sample is held in a chamber that is (i) elongated along an axis, and (ii) configured to pass the beam along the axis, and
   the chamber has a conical inner cross section that substantially expands in a direction of propagation of the beam so as to adapt microfluidic drag forces in the chamber to the forces induced by momentum transfer from photons of the light to the particles.

2. The method of claim 1, wherein the beam is a laser beam with a transverse electromagnetic mode other than TEM00.

3. The method of claim 2, wherein the transverse electromagnetic mode has at least one maximum in a plane normal to the direction of propagation that is annular around an axis of the direction of propagation.

4. The method of claim 2, wherein the transverse electromagnetic mode is a cylindrical TEM01* mode.

5. The method of claim 2, further comprising measuring at least one of (i) a steady speed that at least one of the particles reaches while being irradiated, a decay or a building behavior of the speed of the at least one of the particles after discontinuing or initiating the irradiation, or (ii) an orbital momentum or a rotation induced by the irradiation.

6. The method of claim 1, further comprising flowing the fluidic sample in a direction substantially parallel, or substantially opposite, to the direction of propagation.

7. The method of claim 6, wherein a spatial distribution of a flow rate is configured to satisfy a predetermined continuity equation.

8. The method of claim 6, wherein a flow rate varies across a cross section of the flow in a parabolic manner and is highest in a center of the cross section.

9. The method of claim 1, further comprising capturing light that has been scattered by the particles in a direction substantially perpendicular to the direction of propagation.

10. A method for analyzing a fluidic sample with dispersed particles, comprising:
    irradiating the fluidic sample with light, so that the photons of a light transfer momentum to the dispersed particles;
    measuring at least one property of the dispersed particles that is altered by the momentum transfer, wherein the light is a beam that is at least one of (i) a propagating beam having an intensity distribution that has gradients pointing to more than one point within each plane normal to a direction of propagation, while varying steadily along the direction of propagation, or (ii) a three-dimensional vortex trap beam that is configured to confine the dispersed particles in a three-dimensional volume using high-intensity gradients;
    flowing the fluidic sample in a direction substantially parallel, or substantially opposite, to the direction of propagation; and
    separating at least some of the particles that move at a different speed in the direction of propagation than others of the particles from the rest of the particles.

11. A method for analyzing a fluidic sample with dispersed particles, comprising:
    irradiating the fluidic sample with light, so that the photons of a light transfer momentum to the dispersed particles;
    measuring at least one property of the dispersed particles that is altered by the momentum transfer, wherein the light is a beam that is at least one of (i) a propagating beam having an intensity distribution that has gradients pointing to more than one point within each plane normal to a direction of propagation, while varying steadily along the direction of propagation, or (ii) a three-dimensional vortex trap beam that is configured to confine the dispersed particles in a three-dimensional volume using high-intensity gradients; and
    unevenly illuminating at least one of the particle that is larger than the wavelength of the light, and detecting a compression of the at least one of the particles caused by the uneven illumination.

* * * * *